Patented Aug. 18, 1931

1,819,053

UNITED STATES PATENT OFFICE

WERNER ZERWECK AND ERNST HONOLD, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

NEW VAT DYESTUFFS OF THE BENZANTHRONE SERIES AND PROCESS OF MAKING SAME

No Drawing. Application filed February 6, 1929, Serial No. 338,024, and in Germany February 10, 1928.

Our present invention relates to new vat dyestuffs and to a process of making them, more particularly it relates to new vat dyestuffs of the benzanthrone series obtainable by acting with an acid condensing agent on an benzanthronyl-amino anthraquinone containing at least one aroylamino group in the anthraquinone residue and corresponding probably to the general formula:

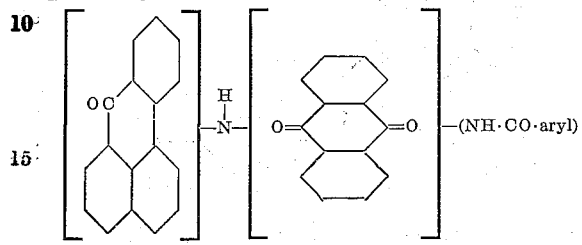

wherein the benzanthrone as well as the anthraquinone as the aryl residue may contain further substituents. As suitable acid condensing agents anhydrous aluminium chloride, chlorosulfonic and sulfuric acid may be named. The course of the reaction can not be given with certainty; it may be assumed that the condensation takes place between the benzanthrone and the anthraquinone residues and that products are formed which contain a new carbazol-like ring, while apparently the aroylaminogroup is not attacked.

The new products are when dry dark powders soluble in concentrated sulfuric acid with a bluish to violet color, they form with an alkaline hydrosulfite solution brownish to bluish to violet vats from which the vegetable fiber is dyed brownish to greenish to bluish shades of an excellent fastness.

When using sulfuric or chlorosulfonic acid as a condensing agent in some cases simultaneously a sulfonic acid group can be introduced into the molecule of the condensation products, a fact which favors their solubility in the vat without affecting their fastness properties.

In order to further illustrate our invention the following examples are given, the parts being by weight and all temperatures in centigrade degrees, but it is understood, that our invention is not limited to the particular products or reacting conditions mentioned therein.

Example 1

50 parts of bz-1-benzanthronyl-1-amino-5-benzoyl-amino-anthraquinone (soluble in concentrated sulfuric acid with a brown color, obtainable by condensing 1-amino-5-benzoyl-amino-anthraquinone with bz-1-bromobenzanthrone) are introduced at about 130–140° into a mixture of about 250 parts of anhydrous aluminium chloride and 50 parts of sodium chloride and the mass is kept for some time at this temperature. Then it is poured on water and after boiling up the acidified mass in order to dissolve the aluminium compounds the separated dyestuff is filtered off. It dissolves in concentrated sulfuric acid with a blue color, it is dfficultly soluble in an alkaline hydrosulfite solution with a dark brown color and dyes cotton from this vat bright yellowish brown tints of an excellent fastness.

The ring closure occurring probably by the reaction may be illustrated by the dotted line in the following formula:

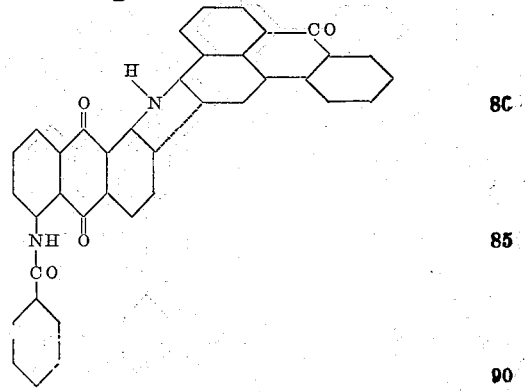

Example 2

A solution of 50 parts of bz-1-benzanthronyl-1-amino-5-benzoylaminoanthraquinone (obtainable as described in Example 1) in 800 parts of sulfuric acid monohydrate is stirred at 20–30° for some hours, until the previously dark brown solution has turned to a pure blue coloration. Then the mass is poured on ice and the separated dyestuff is filtered off. It corresponds in its properties to the dyestuff obtainable according to Example 1, but it is superior as to its solubility in the vat. Apparently the structure of the condensation product is identical with that given in Example 1, but it contains a sulfonic acid group.

When starting from the condensation product of 1-amino-5-benzoyl-aminoanthraquinone with 6-bz-1-dibrombenzanthrone, a dyestuff is obtained which is soluble in concentrated sulfuric acid with a greenish blue color. It dyes cotton yellowish brown shades.

Example 3

20 parts of 2'-benzanthronyl-1-amino-4-benzoyl-aminoanthraquinone (obtainable by condensing 2-chloro-benzanthrone with 1-amino-4-benzoylaminoanthraquinone) are dissolved while stirring at about 20–25° in 160 parts of chlorosulfonic acid. The solution is stirred for some hours at the same temperature and then it is allowed to run into about 200 parts of sulfuric acid of about 62 per cent strength. When the evolution of hydrochloric acid has ceased the separated reddish violet sulfate of the condensation product is filtered off and converted into the dyestuff by treatment with water. The dyestuff represents when dry a dark green powder difficultly soluble in organic solvents of a higher boiling point such as nitrobenzene with a yellowish green color, in sulfuric acid of about 82 per cent strength with a reddish blue color. It forms a violet vat and dyes cotton therefrom strong yellowish green shades of an excellent fastness.

In an analogous manner as shown in Example 1 the ring closure probably involved by the reaction may be illustrated by the dotted line in the following formula:

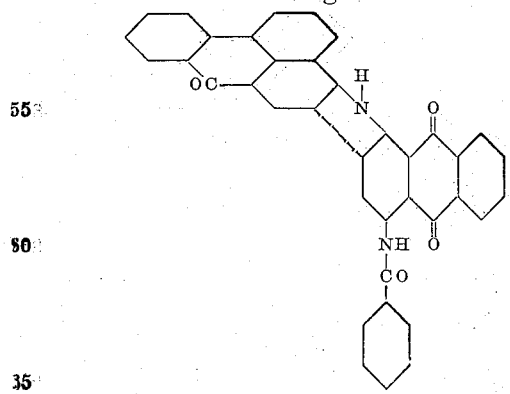

The reaction may be carried out likewise by using other acid condensing agents such as sulfuric acid monohydrate or fuming sulfuric acid.

Example 4

30 parts of (6-benzanthronyl)-1-amino-4-benzoylaminoanthraquinone (obtainable by condensing 1-amino-4-benzoylaminoanthraquinone with 6-chlorobenzanthrone) are dissolved in 400 parts of chlorosulfonic acid and the solution is kept at about 40° for some time. The dyestuff is isolated in the usual manner. Whereas the starting material dissolves in sulfuric acid with a brown color the dyestuff dissolves with a bluish green color. It forms an orange brown vat and dyes cotton grey brown shades. According to the statements made above we ascribe to it the following formula:

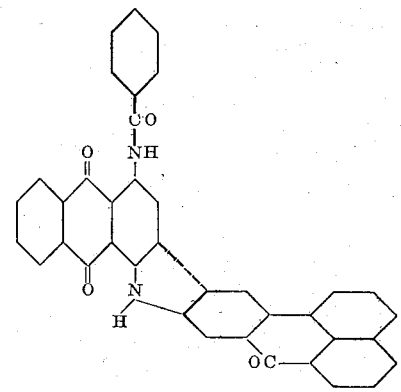

When starting from the isomeric condensation product obtainable by condensing 6-chlorobenzanthrone with 1-amino-5-benzoylamino-anthraquinone (dissolving with a brown color in concentrated sulfuric acid) and carrying out the process correspondingly a dyestuff is obtained, which dissolves in sulfuric acid with a greenish blue color and dyes cotton from a brown vat yellowish brown shades.

Example 5

20 parts of the condensation product obtainable by condensing one molecular proportion of 2.6-dichloro-benzanthrone with one molecular proportion of 1-amino-5-benzoyl-amino-anthraquinone are introduced at about 45–50° into 160 parts of chlorosulfonic acid and the solution thus obtained is kept at the same temperature for some hours. Then the mass is poured on ice. The dyestuff thus obtained represents when dry a greenish black powder, it forms a dark green paste, it dissolves in concentrated sulfuric acid with a reddish blue color. From a violet hydrosulfite vat olive-green dyeings of an excellent fastness are obtained. We ascribe to the dyestuff the following probable formula:

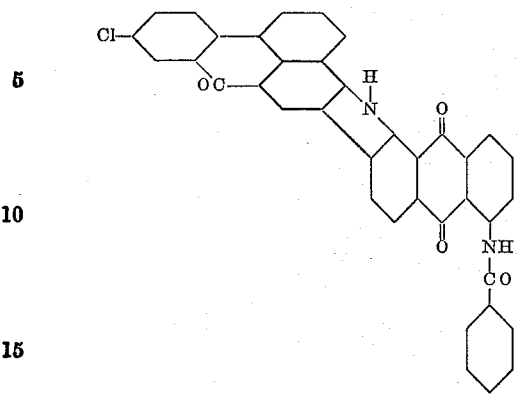

When starting from the isomeric condensation product obtained by condensing 2.6-dichlorobenzanthrone with 1-amino-4-benzoyl-aminoanthraquinone a dyestuff of similar properties is obtained dyeing cotton olive more brownish shades.

We claim:

1. A process which comprises acting with an acid condensing agent of the group consisting of chloro-sulfonic acid, sulfuric acid and aluminium chloride on a benzanthronyl-amino-anthraquinone compound containing at least one aroyl-amino-group in the anthraquinone residue and corresponding probably to the general formula:

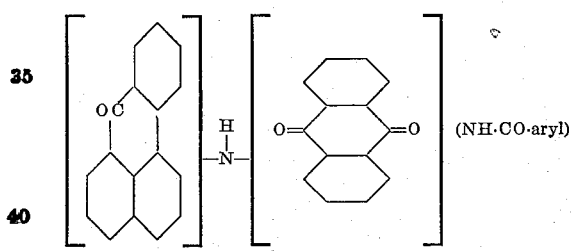

wherein the benzanthrone as well as the anthraquinone and the aryl residue may contain further substituents.

2. A process which comprises acting with an acid condensing agent of the group consisting of chloro-sulfonic acid, sulfuric acid and aluminium chloride on a benzanthronyl-amino-anthraquinone compound containing at least one aryl-amino-group in the anthraquinone residue and corresponding probably to the general formula:

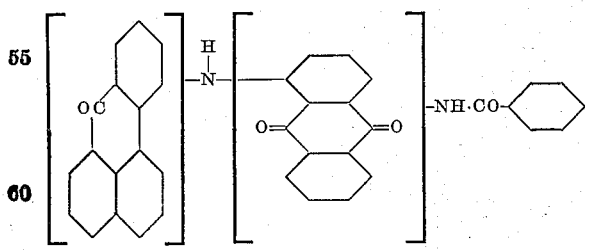

wherein the benzanthrone as well as the anthraquinone and the aryl residue may contain further substituents.

3. A process which comprises acting with an acid condensing agent of the group consisting of sulfuric and chlorosulfonic acid on a benzanthronyl-amino-anthroquinone compound containing at least one aroyl-amino-group in the anthraquinone residue and corresponding probably to the general formula:

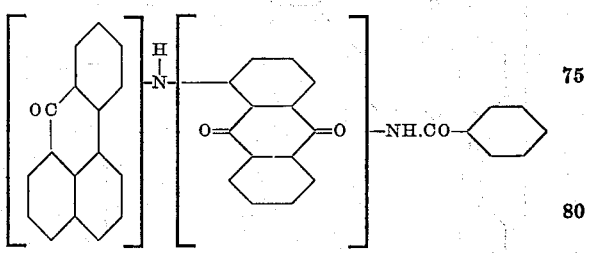

wherein the benzanthrone as well as the anthraquinone and the aryl residue may contain further substituents.

4. As new compounds condensation products corresponding probably to the general formula:

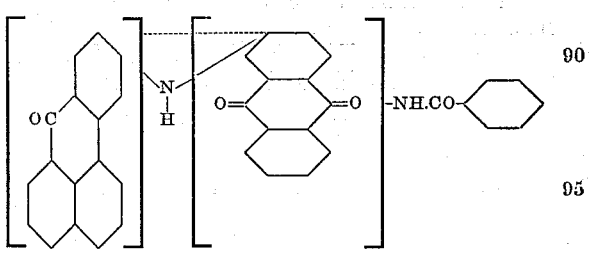

wherein the benzanthrone as well as the anthraquinone and the benzene residue may contain further substituents which compounds are when dry dark powders soluble in concentrated sulfuric acid with a bluish to violet color, which form brownish to bluish to violet vats with an alkaline hydrosulfite solution and dye the vegetable fiber therefrom brownish to greenish to bluish shades of an excellent fastness.

5. As new compounds condensation products corresponding probably to the general formula:

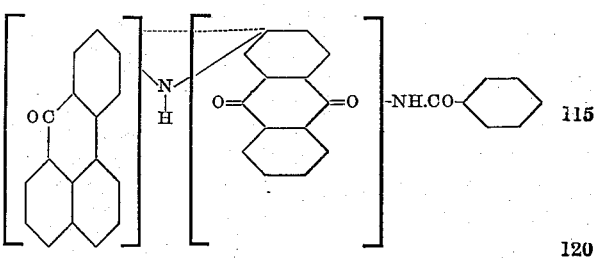

wherein the benzanthrone as well as the anthraquinone and the benzene residue may contain further substituents at least one sulfonic acid group being present in the molecule, which compounds are when dry dark powders soluble in concentrated sulfuric acid with a bluish to violet color, which form brownish to bluish to violet vats with an alkaline hydrosulfite solution and dye the vegetable fiber therefrom brownish to greenish to bluish shades of an excellent fastness.
6. As a new compound the dyestuff of the probable formula:
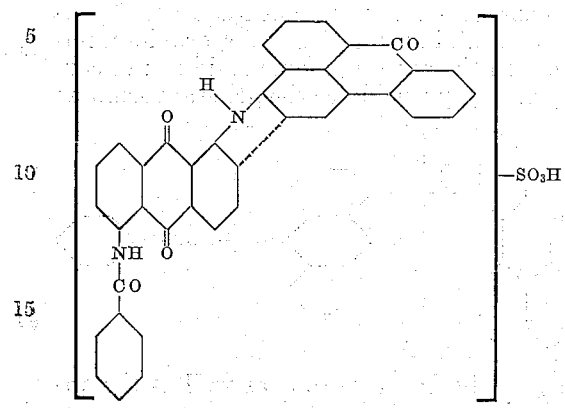
soluble in concentrated sulfuric acid with a blue color, forming a dark brown vat and dyeing cotton therefrom bright yellowish brown tints of an excellent fastness.
In testimony whereof, we affix our signatures.
WERNER ZERWECK.
ERNST HONOLD.